US010487236B2

(12) United States Patent
Salviato et al.

(10) Patent No.: US 10,487,236 B2
(45) Date of Patent: Nov. 26, 2019

(54) RADIATION CURABLE AQUEOUS COMPOSITIONS WITH REVERSIBLE DRYING

(71) Applicant: Allnex Belgium S.A., Drogenbos (BE)

(72) Inventors: Jean-Yves Salviato, Les Bons Villers (BE); Michel Tielemans, Wemmel (BE); Elodie Siband, Brussels (BE); Thierry Randoux, Braine l'Alleud (BE)

(73) Assignee: ALLNEX BELGIUM S.A., Drogenbos (BE)

( * ) Notice: Subject to any disclaimer, the term of this patent is extended or adjusted under 35 U.S.C. 154(b) by 0 days.

(21) Appl. No.: 14/648,456

(22) PCT Filed: Jan. 13, 2014

(86) PCT No.: PCT/EP2014/050506
§ 371 (c)(1),
(2) Date: May 29, 2015

(87) PCT Pub. No.: WO2014/111349
PCT Pub. Date: Jul. 24, 2014

(65) Prior Publication Data
US 2015/0322291 A1  Nov. 12, 2015

(30) Foreign Application Priority Data
Jan. 17, 2013  (EP) .................... 13151649

(51) Int. Cl.
| | |
|---|---|
| *C08G 18/08* | (2006.01) |
| *C08G 18/10* | (2006.01) |
| *C08G 18/42* | (2006.01) |
| *C08G 18/44* | (2006.01) |
| *C08G 18/67* | (2006.01) |
| *C08G 18/73* | (2006.01) |
| *C08G 18/81* | (2006.01) |
| *C09D 11/101* | (2014.01) |
| *C09D 11/30* | (2014.01) |
| *C09D 175/06* | (2006.01) |
| *C09D 175/16* | (2006.01) |

(52) U.S. Cl.
CPC ....... *C09D 175/06* (2013.01); *C08G 18/0823* (2013.01); *C08G 18/10* (2013.01); *C08G 18/4238* (2013.01); *C08G 18/44* (2013.01); *C08G 18/672* (2013.01); *C08G 18/673* (2013.01); *C08G 18/73* (2013.01); *C08G 18/81* (2013.01); *C09D 11/101* (2013.01); *C09D 11/30* (2013.01); *C09D 175/16* (2013.01)

(58) Field of Classification Search
CPC .... C09D 175/06; C09D 11/101; C09D 11/30; C09D 175/16; C08G 18/672; C08G 18/673; C08G 18/73; C08G 18/0823; C08G 18/10; C08G 18/4238; C08G 18/44; C08G 18/81

See application file for complete search history.

(56) References Cited

U.S. PATENT DOCUMENTS

| | | | |
|---|---|---|---|
| 5,913,971 A | 6/1999 | Fujimatsu et al. | |
| 6,521,702 B1* | 2/2003 | Weikard | C08G 18/0823 428/423.1 |
| 2002/0156145 A1 | 10/2002 | Van Den Berg et al. | |
| 2004/0242763 A1 | 12/2004 | Tielemans et al. | |
| 2007/0148460 A1* | 6/2007 | Licht | C08G 18/0866 428/403 |
| 2009/0131571 A1* | 5/2009 | Fraser | C08F 20/12 524/431 |
| 2012/0129982 A1* | 5/2012 | Zipplies | C08F 14/18 524/58 |

(Continued)

FOREIGN PATENT DOCUMENTS

| | | |
|---|---|---|
| EP | 2 143 748 | 1/2010 |
| JP | 5-339307 | 12/1993 |

(Continued)

OTHER PUBLICATIONS

International Search Report dated Mar. 25, 2014 in International (PCT) Application No. PCT/EP2014/050506.

*Primary Examiner* — Patrick D Niland
(74) *Attorney, Agent, or Firm* — Wenderoth, Lind & Ponack, L.L.P.

(57) ABSTRACT

The present invention relates to an aqueous resin composition (I) comprising at least one polymerizable ethylenically unsaturated polyurethane polymer (A), optionally, at least one polymerizable ethylenically unsaturated compound (B) different from (A), and optionally, at least one neutralizing agent (C); wherein the polyurethane polymer (A) has a weight average molecular weight of less than 15.000 Daltons and is obtained from the reaction of: at least one polyisocyanate (i); at least one hydrophilic compound (ii) containing at least one reactive group capable to react with isocyanate groups and at least one group which is capable to render the polyurethane polymer dispersible or soluble in aqueous medium either directly or after reaction with a neutralizing agent (C) to provide a salt; at least one compound (iii) containing essentially one reactive group capable to react with isocyanate groups and at least one copolymerizable ethylenically unsaturated group; at least one compound (iv) containing at least two reactive groups capable to react with isocyanate groups; and, optionally, at least one chain extender (v) containing at least two reactive groups capable to react with isocyanate groups, which chain extender is different from compounds (iv); and wherein the non-volatile components of the resin composition (I) after drying are re-dispersible or re-soluble in water at 25° C. The present invention further relates to radiation curable compositions comprising a resin composition of the invention for use in coating applications or graphic art applications.

21 Claims, No Drawings

(56) References Cited

U.S. PATENT DOCUMENTS

| | | | |
|---|---|---|---|
| 2012/0321900 A1 | 12/2012 | Schwalm et al. | |
| 2013/0040142 A1* | 2/2013 | Frey | C08F 2/24 |
| | | | 428/402 |
| 2013/0281616 A1 | 10/2013 | Tielemans et al. | |

FOREIGN PATENT DOCUMENTS

| | | |
|---|---|---|
| JP | 2001-192428 | 7/2001 |
| JP | 2004-512402 | 4/2004 |
| JP | 2007-2051 | 1/2007 |
| JP | 2009-533504 | 9/2009 |
| JP | 2010-1457 | 1/2010 |
| JP | 2012-193253 | 10/2012 |
| WO | 03/010250 | 2/2003 |
| WO | 03/046095 | 6/2003 |
| WO | 2012/089538 | 7/2012 |
| WO | 2012/171833 | 12/2012 |

\* cited by examiner

RADIATION CURABLE AQUEOUS COMPOSITIONS WITH REVERSIBLE DRYING

The present invention relates to radiation curable aqueous compositions comprising water-soluble or water-dispersible polyurethane polymers, and in particular to aqueous polyurethane polymer-based ink compositions which can be crosslinked to yield a three-dimensional network after being applied to an appropriate substrate.

Water-based inks represent a growing market due to environmental pressure. Traditionally, such inks are made essentially from the blend of a water-based polymeric binder (typically an acrylic latex, see e.g. U.S. Pat. No. 5,913,971) and a pigment dispersion in water, or alternatively a colorant.

Water-based inks for inkjet applications have been described. However, such inks must exhibit water-, solvent- and light-resistance as well as thermostability. Clogging of the jetting channels as a result of pigment flocculation, dye crystallization or water evaporation resulting in polymer drying at the nozzles should be avoided to ensure a smooth and robust printing process.

It is known by those skilled in the art that waterborne ink formulations derived from a polymer dispersion in water easily form a continuous film after drying if the temperature is above the minimum film formation temperature (MFFT). This phenomenon corresponds to the irreversible drying of the polymer composition that causes a lot of troubles during and after the application of the ink by conventional techniques like flexography and heliography. It is even worse in the case of inkjet inks, as the nozzles of the print heads block upon drying and interrupt the printing process. An advantage of the drying not being irreversible is that the final ink causes less trouble when the ink adheres to, and is built upon, a deflecting electrode or ink nozzle.

To circumvent these serious problems of productivity and reliability, the ink must exhibit a particular behavior often referred to as "re-solubility" or "re-dispersibility", meaning that the ink will have a higher water retention during the film formation, responsible for a slower and reversible drying process which is less detrimental to the quality and robustness of the printing process.

Films obtained from water dispersible polyurethane polymers are most generally not re-dispersible in water.

It is found that an improved re-solubility (re-dispersibility) of the polymers can be obtained with a sufficiently hydrophilic character associated with a low molecular weight. As a direct consequence, these polymers however show worse water and solvent resistance. A good re-solubility or re-dispersibility is difficult to achieve in combination with other desired mechanical and chemical properties, including water and solvent resistance of the ink, as a result of the ionomeric nature of the polymer and its associated hydrophilicity required for the re-solubility. The antagonism between water solubility and water & solvent resistance can be advantageously resolved by crosslinking the polymer, provided that the crosslinking density is high enough to ensure the water and solvent resistance. While thermal curing of the polymer material at ambient or elevated temperature is possible by using the right polymer functionality and/or the right crosslinker, such compositions in general suffer from a limited pot-life and from possible gels or coagulation due to a premature and uncontrolled crosslinking reaction, detrimental for the ink application.

Radiation curable compositions would not suffer from these limitations and provide at the same time very stable compositions, with an extremely long shelf-life that is compatible with the ink application, and with a very high crosslinking density desired for water and solvent resistance. The film formation and the coating curing by irradiation are taking place in two distinctive steps that can be advantageously controlled during the application process of the ink.

WO03/010250 discloses water-based inks containing a polyurethane polymer to which at least one colorant is covalently bonded. The disclosed ink compositions after application and crosslinking have good optical properties, such as light-resistance & color development, together with superior physical properties, such as water-resistance, solvent-resistance, rubbing and scratch resistance. The re-solubility level of compounds disclosed therein, however, is still not sufficient and their molecular weight is much too high for smooth and robust application as an ink(jet) binder.

There is a continuous demand for water-dispersible or water-soluble polyurethanes that provide improved re-dispersibility or re-solubility, in combination with other important application features like slow drying, due to higher water retention during film formation. It is further desired to achieve a high performance of the cured polymer binder, such as a good flexibility and adhesion in combination with good mechanical properties (like scratch and/or abrasion resistance), chemical resistance (like water, solvent and/or stain resistance), weathering resistance and/or good optical properties (like adequate transparency, haze and/or gloss).

Against this background, we now provide an aqueous resin composition (I) comprising at least one polymerizable ethylenically unsaturated polyurethane polymer (A), optionally, at least one polymerizable ethylenically unsaturated compound (B) different from (A), and, optionally at least one neutralizing agent (C);

wherein the polyurethane polymer (A) has a weight average molecular weight of less than 15.000 Daltons and is obtained from the reaction of: at least one polyisocyanate (i); at least one hydrophilic compound (ii) containing at least one reactive group capable to react with isocyanate groups and at least one group which is capable to render the polyurethane polymer dispersible or soluble in aqueous medium either directly or after reaction with a neutralizing agent (C) to provide a salt; at least one compound (iii) containing at least one reactive group capable to react with isocyanate groups and at least one copolymerizable ethylenically unsaturated group; at least one compound (iv) containing at least two reactive groups capable to react with isocyanate groups; and, optionally, at least one chain extender (v) containing at least two reactive groups capable to react with isocyanate groups, which chain extender is different from compounds (iv); and wherein the non-volatile components of the resin composition (I) after drying are re-dispersible or re-soluble in water (typically demineralized water) at 25° C.

It is known that urethane polymers that are not re-soluble or re-dispersible in water can become so in the case that alkaline water with a pH above 7, preferably above 9, is used for the polymer recovery. In that case, the urethane polymers often contain carboxylic, sulfonic or phosphonic acid functions in an excess so that a re-soluble or re-dispersible polymer is obtained after the neutralization of the acid with alkaline water and the subsequent formation of an ionomer. This feature may be interesting in the case of multi-step processes or cleaning operations implying the re-solubility or re-dispersability of the polymer after the film formation, but without having the benefit of controlled water retention during the film formation. It presents also the constraint to use alkaline water instead of water. Resin compositions (I) of the invention advantageously do not suffer from the above disadvantages.

In other words the film formed from the resin composition (I) of the invention, after drying is re-dispersible (in casu re-soluble, depending on the nature of the polyurethane polymer A) in water at 25° C. The water used typically is demineralized water.

The resin compositions of the invention can be solutions or dispersions in an aqueous medium, but typically they are dispersions in an aqueous medium. The aqueous medium typically is water, usually it is demineralized water.

Hence preferred are aqueous resin composition (I) comprising at least one polymerizable ethylenically unsaturated polyurethane polymer (A), optionally, at least one polymerizable ethylenically unsaturated compound (B) different from (A), and, optionally at least one neutralizing agent (C); wherein the polyurethane polymer (A) has a weight average molecular weight of less than 15.000 Daltons and is obtained from the reaction of: at least one polyisocyanate (i); at least one hydrophilic compound (ii) containing at least one reactive group capable to react with isocyanate groups and at least one group which is capable to render the polyurethane polymer dispersible in aqueous medium either directly or after reaction with a neutralizing agent (C) to provide a salt; at least one compound (iii) containing at least one reactive group capable to react with isocyanate groups and at least one copolymerizable ethylenically unsaturated group; at least one compound (iv) containing at least two reactive groups capable to react with isocyanate groups; and, optionally, at least one chain extender (v) containing at least two reactive groups capable to react with isocyanate groups, which chain extender is different from compounds (iv); and wherein the non-volatile components of the resin composition (I) after drying are re-dispersible in water (typically demineralized water) at 25° C. In other words the film formed from the resin composition (I) of the invention, after drying is re-dispersible in water at 25° C. The water used typically is demineralized water.

Typically resin compositions (I) of the invention comprise, relative to the total weight of compounds (A) and (B), from 60 to 100% by weight of compounds (A) and from 0 to 40% by weight of compounds (B).

Usually resin compositions (I) of the invention comprise, relative to the total weight of compounds (A) and (B), from 70 to 100% by weight of compounds (A) and from 0 to 30% by weight of compounds (B); most preferably from 80 to 100% by weight of compounds (A) and from 0 to 20% by weight of compounds (B). For some applications it is advantageous to have no compounds (B) present.

Typically the resin compositions (I) of the invention consist essentially of the aqueous medium, typically water, of the compounds (A) and where present compounds (B) and/or (C). By "consisting essentially of" is meant to designate in particular that the sum of the weight percentages of these compounds accounts for at least 95% by weight, preferably at least 97% by weight, more preferably at least 99% by weight up to 100% by weight.

Resin compositions (I) of the invention typically contain from 18 to 50% by weight, more preferably from 30 to 40% by weight of the polyurethane polymers (A); from 0 to 20% by weight, more preferably from 0 to 10% by weight of compounds (B); from 0 to 20% by weight of compounds (C), and from 50 to 70% by weight, more preferably from 55 to 65% by weight of water. When used compounds (C) are typically present in an amount of from 0.25 to 5% by weight, more preferably in an amount of from 0.5 to 2% by weight, relative to the total weight of the resin composition (I). For some applications it is advantageous to have no compounds (B) present.

By a "polymerizable ethylenically unsaturated" compound is meant to designate in the present invention that the compound is bearing at least one, in general at least two polymerizable ethylenically unsaturated groups. By "polymerizable ethylenically unsaturated groups" is meant to designate in the present invention carbon-carbon double bonds which under the influence of irradiation and/or a (photo) initiator can undergo radical polymerization. The polymerizable ethylenically unsaturated groups are generally chosen from (meth)acrylic, allylic and/or vinylic groups. Preferably they are (meth)acrylic groups, most preferably acrylic groups. In the present invention, the term "(meth)acryl' is to be understood as to encompass both acryl and methacryl, or derivatives as well as mixtures thereof. Typically compound (A) is a (meth)acrylated polyurethane polymer, more in particular an acrylated polyurethane polymer.

The polyurethane polymer (A) of the invention can we water-soluble (also known as water-dilutable) or water-dispersible, but most typically this compound is water-dispersible. The advantage of a water-dispersible composition is the lower viscosity compared to polymer solutions in water.

By a "water-soluble" compound is meant to designate in the present invention that the compound permits to form a homogeneous, single phase mixture when the compound is mixed with water in any proportion, but preferably over a concentration range of 50 to 75 wt % of water in the total mass of water and the compound. This allows a suitable viscosity window acceptable for handling the product. The viscosity of the solution in aqueous medium (typically water) ideally does not exceed 50.000 mPa·s at 25° C., more preferably it does not exceed 15.000 mPa·s and most preferably it does not exceed 5.000 mPa·s at 25° C.

The viscosity of a dispersion in aqueous medium (typically water) ideally does not exceed 5.000 mPa·s at 25° C., more preferably it does not exceed 1.000 mPa·s and most preferably it does not exceed 500 mPa·s at 25° C.

By a "water-dispersible" compound is meant to designate in the present invention that the compound, when mixed with an aqueous medium, forms a two-phase system of small particles (mean average particle size of max 150 nm) dispersed in water as a stable colloid. By a "stable colloid" is meant to designate a colloidal stability of at least 5 days, preferably at least 7 days, more preferably at least 10 days at 60 degrees Celsius without visible phase separation leading to sedimentation and/or creaming. By "re-dispersible" in the context of the present invention is meant in particular that at most 20% by weight of the non-volatile components of the resin composition (I), after drying and subsequent soaking in demineralized water at 25° C. for 24 hours, have not gone again into dispersion. Usually this amount is at most 15% by weight, more preferably at most 10% by weight, most preferably at most 5% by weight. By "re-soluble" in the context of the present invention is meant in particular that at most 20% by weight of the non-volatile components of the resin composition (I), after drying and subsequent soaking in demineralized water at 25° C. for 24 hours, have not gone again into solution. Usually this amount is at most 15% by weight, more preferably at most 10% by weight, most preferably at most 5% by weight. By "drying" is meant to designate in the present invention the elimination of water until a constant weight is obtained.

Typically compositions (I) of the invention are dried to a constant weight, for instance by drying in an oven of 60° C. for about 16 hours.

In the context of the invention, the following protocol was used to assess re-dispersibility (in casu re-solubility, depending on the nature of compounds A): A series of 3 cleaned and acetone-degreased pieces of a metallic tray of 200 microns mesh (15×45 mm) fitted with a metallic suspending hook are weighted using an analytical balance Mettler AE163 and dipped in the polyurethane (A+B+C) dispersion (in casu solution). The wet trays are then dried in an oven for 18 hours at 60° C. followed by cooling to room temperature. The coated trays are weighted to determine the initial weight W1 (in grams) of dry polyurethane composition (A+B+C) by comparing the initial weight of the trays with the weight of the dry coated trays. The dry coated pieces are then soaked in a glass tube filled with 50 ml Milli Q water at 25° C. for 24 hours. The trays are then carefully removed from the water and drained for 15 minutes, taking care that the swollen polyurethane composition (A+B+C) residues eventually present does not touch the walls of the glass tube. The trays supporting the eventual polyurethane composition (A+B+C) residues are then dried in an oven for 1 hour at 80° C. They are weighed again to provide the insoluble materials weight W2 (in grams) by comparing the initial weight of the trays with the weight of the dry polyurethane composition (A+B+C) residue on the trays. The re-dispersibility (in casu re-solubility) is expressed as the percentage of the insoluble materials weight W2 compared with the original weight W1. An average value for the 3 measurements is reported.

Most typically the resin composition (I) of the invention is a dispersion in water, typically demineralized water. In general, the average particle size is at most 150 nm, usually it is at most 100 nm. In a preferred embodiment of the invention, the average particle size is at most 80 nm, typically at most 70 nm, more typically at most 60 nm. In an even more preferred embodiment of the invention, the average particle size is at most 50 nm, more typically at most 40 nm. This particle size is also referred to herein as the original particle size. Typically the average particle size is at least 10 nm.

In a particular embodiment of the invention, the average particle size is in the range of from 10 to 100 nm, typically of from 20 to 80 nm, preferably of from 20 to 60 nm, most preferably of from 20 to 50 nm. The most preferred average particle size is from 20 to 40 nm.

Typically the average particle size, after drying and then re-dispersion in water (typically demineralized water), is increased by at most factor 10 compared to the original particle size (the one before re-dispersion). Usually the increase in particle size is at most factor 5, more typically at most factor 4. In a preferred embodiment this increase in particle size is at most factor 3, more typically at most factor 2.5, preferably at most 2.3. The re-dispersed polymer preferably is essentially free of polymer grits or polymer flakes with a size above 1.5μ.

Particle sizes and particle size distribution typically are determined via laser light scattering following for instance ISO/DIN 13321 using for instance a Malvern Autosizer Particle Analyzer.

The weight average molecular weight (Mw) of the polyurethane polymer (A) of the invention preferably is below 12.000 Daltons, typically is below 11.000 Daltons. In general the Mw is below 10.000 Daltons, usually below 9.000 Daltons.

In a particular embodiment of the invention it is possible to use polyurethane polymers (A) with a Mw below 8.000 Daltons, even below 7.000 Daltons, in particular below 6.000 Daltons and more in particular below 5.000 Daltons.

In general the weight average molecular weight (Mw) is at least 1.000 Daltons, usually at least 1.500 Daltons, typically at least 2.000 Daltons. Often the Mw is at least 2.500 Daltons, even at least 3.000 Daltons.

In general the weight average molecular weight (Mw) of the polyurethane polymer (A) of the invention is in the range of from 1.000 to 12.000 Daltons, more typically in the range of from 1.000 to 10.000 Daltons, usually in the range of from 2.000 to 9.000 Daltons, preferably in the range of from 3.000 to 9.000 Daltons.

Preferably the number average molecular weight (Mn) is between 1.000 and 5.000 Daltons. Preferably the polydispersity index Mw/Mn is between 1 and 5, typically between 2 and 4.

Molecular weights and polydispersity indices typically are determined by gel permeation chromatography (GPC) using polystyrene standards (e.g. with a MW in the range 200-7.500.000 g/mol). Samples are typically dissolved in tetrahydrofuran prior to filtration and injection into the chromatographic column.

Typically, compounds (A) of the invention are obtained from the reaction of: at least one polyisocyanate (i); at least one hydrophilic compound (ii) containing at least one reactive group capable to react with isocyanate groups and at least one group which is capable to render the polyurethane polymer dispersible (in casu soluble) in aqueous medium either directly or after a reaction with a neutralizing agent to provide a salt; at least one compound (iii) containing at least one reactive group capable to react with isocyanate groups and at least one copolymerizable ethylenically unsaturated group; at least one compound (iv) containing at least two reactive group capable to react with isocyanate groups; and, optionally, at least one chain extender (v) containing at least two reactive groups capable to react with isocyanate groups, which chain extender is different from compounds (iv).

Typically compounds (iii), (iv) and (v) are different from each other.

Typically the weight percentages of compounds (i), (ii), (iii), (iv) and where present (v) add up to 100%. Usually however there is no chain extension with a compound (v) and hence most typically the weight percentages of compounds (i), (ii), (iii) and (iv) add up to 100%.

The polymerizable ethylenically unsaturated water-dispersible (in casu water-soluble) polyurethane polymer (A) is preferably obtained by a process comprising a first step comprising the reaction of a stoechiometric excess of compounds (i) with compounds (iii) and (iv), a second step comprising the reaction of the product of the first step with compounds (ii), and a possible third step wherein the remaining free isocyanate groups provided by the reaction of compounds (i) to (iv) are reacted to give allophanate groups. The formation of allophanate groups increases the branching and the molecular weight of the polymer, which can be favorable for the final performance provided that it does not exceed the boundaries of the invention in terms of maximum molecular weight and re-dispersibility (in casu re-solubility) in water. The formation of urea resulting from the reaction of compounds (v) with the free isocyanates after reacting compounds (i) to (iv) will also increase the chemical and mechanical resistance of the polymer, which can be favorable for the final performance provided that it does not exceed the boundaries of the invention in terms of maximum molecular weight and re-dispersibility (in casu re-solubility) in water. Alternatively, this reaction leading to urea can proceed in water, either in the presence of compounds (v) or after natural hydrolysis of free isocyanates with water.

This process can be carried out by reacting compounds (i), (ii), (iii) and (iv) preferably under substantially anhydrous conditions and at a temperature between 20° C. and 130° C., more preferably between 30° C. and 100° C., until the reaction between the isocyanate groups and the isocyanate-reactive groups is substantially complete. The isocyanate content in the reaction medium can be followed by titration with an amine. The reaction is typically conducted in distinctive steps. In a preferred embodiment of the invention, no solvent is used in the process of making compounds (A).

The reactants are generally used in proportions corresponding to an equivalent ratio of isocyanate groups provided by compound (i) to isocyanate-reactive groups provided by compounds (ii), (iii) and (iv) of from 1:1 to 2:1, preferably from about 1.05:1 to 1.20:1. Hence, the polymerizable unsaturated polyurethane polymer is NCO-terminated. The residual isocyanate content determined by titration with an amine is typically below 0.6 meq/g, preferably below 0.4 meq/g, more preferably below 0.3 meq/g, most preferably below 0.2 meq/g and even most preferably below 0.1 meq/g expressed on the dry monomer, oligomer and polymer composition. During this process, it is common to use catalysts to accelerate the reaction of the isocyanates towards hydroxyls and to use inhibitors in order to prevent the radical reaction of the reactive unsaturations. It is possible in the frame of this invention to use a sequential process during which compound (i) and/or compounds (ii) and/or (iii) and/or (iv) are added incrementally in two or several portions, or with a continuous feed. In one embodiment of the invention compounds (i), (iii) & (iv) are first reacted, followed by the reaction with compounds (ii). In another embodiment of the invention compounds (i), (ii) & (iv) are first reacted, followed by the reaction with compounds (iii).

The compounds (ii), (iii) and (iv) are preferably used in an equivalent ratio (ii):(iii)&(iv) of from 1:1 to 1:10, more preferably from 1:1.5 to 1:5.

The third step of allophanate formation is optional. This step, if present at all, preferably takes place at high temperature, usually from 80 to 130° C., preferably from 90 to 110° C. until the residual isocyanate content is lower than 0.1 meq/g, preferably lower than 0.05 meq/g. Such third step is not used when a residual isocyanate content is needed for further chain extension with compound (v) or with water after dispersion.

Typically, in a fourth step, the polyurethane polymer obtained is dispersed (in casu solubilized) in an aqueous medium by adding the polymer (A) slowly into an aqueous medium, typically water, or reversely by adding an aqueous medium, typically water, to the polymer (A). Typically demineralized water is used. Due to the relatively high viscosity of the polymer associated with a solvent-free process, the second option is preferred. Usually polymer dispersion in water (heterogeneous) proceeds under high shear mixing, although a similar polymer solution in water (homogenous) requires only gentle mixing.

In an embodiment of the invention the polyurethane polymer (A) is non-ionically stabilized. More typically, however, the polyurethane polymer (A) is ionically stabilized and bears ionic groups, more in particular anionic groups, which typically are the result of the neutralization (at least in part) of acidic groups with the neutralizing agent (C).

Usually the dispersion (in casu solution) hence requires the preliminary neutralization of at least part of the acidic groups provided by compounds (ii), such as carboxylic acid groups, sulfonic acid groups and/or phosphonic acid groups, into anionic salts. This is generally done by adding at least one neutralizing agent (C) to the polymer or to the aqueous medium (typically water, most often demineralized water).

Neutralizing agents (C) used for converting acidic groups into a salt can be volatile and/or non-volatile compounds. In the context of the present invention typically low-volatile to non-volatile neutralizing agents (C) are used.

In the embodiment of the invention where the polyurethane polymer (A) is non-ionically stabilized, no neutralizing agent is to be added.

Neutralizing agents (C) used in the context of the invention typically are selected from non-volatile neutralizing agents and/or from organic neutralizing agents with a boiling point higher than 100° C., typically higher than 150° C., more typically higher than 175° C., most typically higher than 200° C. Preferred in the context of the invention are non-volatile neutralizing agents. Non-volatile agents are those whereof a substantial portion (e.g. at least 50%), preferably the totality does not volatilize during film formation under ambient conditions or forced temperature conditions (e.g. 40 to 80° C.). Preferred in this category are inorganic compounds. Inorganic neutralizing agents (C) typically that do not present any volatility.

As mentioned above also organic compounds with a boiling point higher than 100° C., typically higher than 150° C., more typically higher than 175° C., most typically higher than 200° C., can be used. Higher Mw tertiary amines like tripropylamine, triisopropylamine, tributylamine, triisobutylamine, triisopentylamine, triisooctylamine, N,N dimethylcyclohexylamine, N,N-dimethylaniline, N-methyl morpholine or N-ethyl morpholine, N-methyl pyrrolidine and/or N-methyl piperidine, are considered as low-volatile amines. They will volatilize (in part) after a displacement of equilibrium between the ammonium salt, formed from the reaction between the acid and the amine, and the resulting free acid and amine species with a speed depending on the drying conditions of the polymer and the volume:surface ratio of the coating.

Hydroxyl containing tertiary amines, such as triethanolamine, N,N dimethylethanolamine, N-Methyl diethanolamine, 2-Dimethylamino-2-Methyl-1-Propanol (DMA-MP80 from Angus), represent another group of low-volatile amines. The advantage of these products is a better pigment wetting and improved quality of the ink prepared therefrom.

Though not preferred, primary or secondary amines such as diethanolamine, diisopropanolamine, aminomethylpropanol (AMP95 from Angus), can also be used as neutralizing agent when the remaining quantity of isocyanates present is very low or even zero.

Trialkylamines are preferred within this group of low-volatile neutralizing agents.

Non-volatile neutralizing agents for anionic groups are typically bases. Suitable non-volatile bases often comprise monovalent metals, preferably alkali metals such as lithium, sodium and potassium. These non-volatile bases may be used in the form of inorganic or organic compounds, wherein preferably the anions do not remain in the dispersions (in casu solutions) such as hydroxides, hydrides, carbonates and bicarbonates. Preferred in this category are inorganic bases. In this category alkali metal hydroxides such as lithium hydroxide, sodium hydroxide and/or potassium hydroxide are preferred. In the context of the present invention, excellent results were in particular obtained with sodium hydroxide and/or potassium hydroxide as neutralizing agent. Sodium hydroxide is herein the most preferred. Results of re-dispersibility (in casu re-solubility) therewith were better than with the volatile triethylamine (boiling point of 89° C.), the otherwise most frequently used neutralizing agent for polyurethane dispersions. Suitable non-volatile neutralizing agents for cationic groups include inorganic strong acids such as phosphoric acid and/or sulfuric acid, as well as organic acids such as formic acid, acetic acid, lactic acid, dimethylolpropionic acid, oxalic acid, citric acid, fatty acids and/or (meth)acrylic acid or its dimer. Preferred in this category is acetic acid.

If the resin possesses only ionic groups, the resin should normally have an acid number or amine number of at least 10 mg KOH/g, preferably this value is in the range of from 20 to 100 mg KOH/g, and especially in the range of from 20 to 40 mg KOH/g, in order for the resin to be rendered water-(re)dispersible (in casu water-(re)soluble) after (partial) neutralization of the ionic groups. The same stoichiometry applies to the acid number in the case of anionic stabilization and to the amine number in the case of a cationic stabilization.

The total amount of neutralizing agents (C) to be used can be calculated according to the total amount of ionic groups, typically acidic groups, to be neutralized. Generally a stoechiometric ratio of about 0.3:1 to 1.1:1 is used. Preferably the stoechiometric ratio is from 0.3:1 to 0.95:1 so that not all ionic groups, typically acidic groups, are necessarily neutralized.

The polymerizable ethylenically unsaturated water-dispersible polyurethane polymer (A) preferably contains less than 0.4 meq of allophanate groups —NH—CO—N—CO—O— per g of polyurethane polymer (solid). More preferably the content of allophanate groups in the polyurethane polymer (A) is at most 0.25 meq/g.

The level of allophanate functionality can be theoretically calculated by the secondary reaction of isocyanates with urethanes after the completion of the primary urethanization reaction. This method is convenient as a good indication of the allophanate level in the absence of additional analytical evidence provided by nuclear magnetic resonance spectroscopy (NMR).

The polymerizable ethylenically unsaturated water-dispersible polyurethane polymer (A) usually is non physically drying (or tacky) before cure as a result of the low molecular weight and the low glass transition temperature of the polymer. Below some more information on the reagents typically used to prepare polyurethane polymers (A) according to the invention:

By a polyisocyanate compound (i) is meant to designate an organic compound comprising at least two isocyanate groups. The polyisocyanate compound usually comprises not more than six, usually not more than three isocyanate groups. The polyisocyanate compound (i) is most preferably a di-isocyanate. The polyisocyanate compound is generally selected from aliphatic, cycloaliphatic, aromatic and/or heterocyclic polyisocyanates or combinations thereof.

Examples of aliphatic and cycloaliphatic polyisocyanates are 1,6-diisocyanatohexane (HDI), 1,1'-methylene bis[4-isocyanatocyclohexane] (H12MDI), 5-isocyanato-1-isocyanatomethyl-1,3,3-trimethyl-cyclohexane (isophorone diisocyanate, IPDI), 2,2,4 trimethyl hexamethylene diisocyanate (TMDI), 1,4 cyclohexane diisocyanate (CHDI), 1,3 bis(isocynatomethyl)cyclohexane. Aliphatic polyisocyanates containing more than two isocyanate groups are for example the derivatives of above mentioned diisocyanates like 1,6-diisocyanatohexane (HDI) biuret and isocyanurate. Examples of aromatic polyisocyanates are 1,4-diisocyanatobenzene (BDI), 2,4-diisocyanatotoluene (2,4-TDI), 2,6-diisocyanatotoluene (2,6-TDI), 1,1'-methylenebis[4-isocyanatobenzene] (MDI), xylylene diisocyanate (XDI), tetramethylxylylene diisocyanate (TMXDI), 1,5-naphtalene diisocyanate (NDI), tolidine diisocyanate (TODI) and p-phenylene diisocyanate (PPDI).

The polyisocyanate is preferably selected from aliphatic and cycloaliphatic polyisocyanates, more preferably diisocyanates. Especially preferred is 1,6-diisocyanatohexane (HDI).

The amount of polyisocyanate compounds (i) generally is from 10 to 60% by weight of the polyurethane polymer (A), preferably from 10 to 50% by weight, and more preferably from 20 to 40% by weight.

The aliphatic and cycloaliphatic isocyanates are usually preferred because they provide almost uncolored transparent coatings that provide a good ageing capability without yellowing and without deterioration of the mechanical properties after cure.

In some embodiments of the invention, compounds (ii) are used that provide for non-ionic water-solubilizing groups like polyoxyalkylene groups such as polyoxyethylene and polyoxypropylene groups. Preferred in this category are the polyoxyalkylene groups and, especially, polyoxyethylene groups. Suitable groups which require neutralization or acidification in order to become ionic include, for example, carboxylic acid (anionic stabilization), sulfonic acid (anionic stabilization), phosphonic acid (anionic stabilization) and amine (cationic stabilization) groups. Preferred are compounds (ii) that provide for ionic water-solubilizing groups (cationic or anionic). Often these ionic water-solubilizing groups are anionic groups and most often acidic groups. Most often they are carboxylic acid groups. Preferably however the compound (ii) groups which are capable to render the polyurethane polymer dispersible (in casu soluble) in aqueous medium are anionic groups, most often obtained from the (at least partial) neutralization of acidic groups. Preferred are hence ionic compounds (ii), more in particular anionic compounds (ii). Most typically compounds (ii) contain groups that render the polyurethane polymer dispersible in aqueous medium.

The hydrophilic compound (ii) is generally a polyol comprising a functional group that can exhibit an ionic or non-ionic hydrophilic nature. Preferred are those that can exhibit an ionic hydrophilic nature after neutralization.

Particularly preferred are polyols containing one or more anionic salt groups, such as carboxylate, sulfonate or phosphate salt groups or acid groups which may be converted into an anionic salt group, such as carboxylic acid, sulfonic acid or phosphonic acid groups. Preferred herein are hydroxycarboxylic acids represented by the general formula (HO)xR(COOH)y, wherein R represents a straight or branched hydrocarbon residue having 1 to 12 carbon atoms, and x and y independently are integers from 1 to 3. Examples of these hydroxycarboxylic acids include citric acid, malic acid, lactic acid and tartaric acid. The most preferred hydroxycarboxylic acids are the α,α-dimethylolalkanoic acids, wherein x=2 and y=1 in the above general formula, such as for example, 2,2-dimethylolpropionic acid and 2,2-dimethylolbutanoic acid.

The amount of hydrophilic compounds (ii) generally is from 2 to 25% by weight of the polyurethane polymer (A). Often the amount of hydrophilic compounds (ii) used is preferably at least 3% by weight and often at most 10% by weight.

Compounds (iii) typically are polymerizable ethylenically unsaturated compounds that have one or more reactive groups capable to react with isocyanate groups as well as at least one (meth)acrylated group. Compounds containing one or more unsaturated function such as an acrylic or methacrylic group, and essentially one nucleophilic function capable of reacting with isocyanate groups, preferably an hydroxyl group, are preferred. Particularly preferred are compounds containing one or more unsaturated function such as an acrylic or methacrylic group, and one nucleophilic function capable of reacting with isocyanate groups, preferably an hydroxyl group. More preferred are (meth) acryloyl mono-hydroxy compounds, more particularly poly (meth)acryloyl mono-hydroxy compounds. Acrylates are particularly preferred.

Useful compounds include the esterification products of aliphatic and/or aromatic polyols with (meth)acrylic acid, the final reaction product having a residual average hydroxyl functionality of about 1. The partial esterification products of (meth)acrylic acid with tri-, tetra-, penta- or hexahydric polyols or mixtures thereof are preferred. It is known to the skilled person that the partial esterification of tri-, tetra-, penta- or hexahydric polyols or their mixtures with (meth) acrylic acid proceeds to a mixture of compounds going from the monoacrylate to the hexaacrylate in the case of a hexahydric polyol and some minor amounts of other side products. The obtained mixture hence inherently contains a portion of fully acrylated polyol. It is known that the proportions of the different acrylates formed can be modified by modifying the reaction parameters such as the stoichiometry between the polyol and (meth)acrylic acid. In the present case, a compound (iii) containing essentially one nucleophilic function capable of reacting with isocyanate groups is a compound (iii) obtained with a stoichiometry between the polyol and (meth)acrylic acid designed to obtain a residual average hydroxyl functionality of about 1. In this context, it is also possible to use reaction products of such polyols with ethylene oxide and/or propylene oxide or mixtures thereof, or reaction products of such polyols with lactones or lactides, which add to these polyols in a ring-opening reaction. Examples of suitable lactones are γ-butyrolactone and, in particular δ-valerolactone and ε-caprolactone. Preferred are those alkoxylated polyols having not more than three alkoxy groups per hydroxyl functionality and ε-caprolactone-modified polyols. These modified or unmodified polyols are partly esterified with acrylic acid, methacrylic acid or mixtures thereof until the desired residual hydroxyl functionality is reached.

Particularly preferred are compounds comprising at least two (meth)acryl functions such as glycerol diacrylate, trimethylolpropane diacrylate, pentaerythritol triacrylate, ditrimethylolpropane triacrylate, dipentaerythritol pentaacrylate and their (poly)ethoxylated and/or (poly)propoxylated equivalents. Particularly preferred is for instance the propoxylated form of trimethylolpropane diacrylate (TMP-3PODA) or the propoxylated form of glycerol diacrylate (GLY-3PODA). For instance, propoxylated trimethylolpropane diacrylate (TMP-3PODA) is the product obtained by having reacted 1 mole of propoxylated trimethylolpropane with 2 moles of acrylic acid and it has a residual average hydroxyl functionality of about 1 and an average acrylate functionality of about 2. It is named propoxylated trimethylolpropane diacrylate (TMP-3PODA), but the skilled person knows that it contains a mixture of acrylates going from the mono- to the triacrylate.

Compounds obtained from the reaction of (meth)acrylic acid with aliphatic, cycloaliphatic or aromatic compounds bearing an epoxy functionality together with optionally at least one (meth)acrylic functionality can be used as well.

Compounds obtained from the reaction of an aliphatic, cycloaliphatic or aromatic acid with a (meth)acrylate containing an epoxy group, such as glycidyl (meth)acrylate, can also be used. An example thereof is a monofunctional epoxyacrylate like EBECRYL®113.

Other suitable compounds are the (meth)acrylic esters with linear and branched polyols in which at least one hydroxy functionality remains free, like hydroxyalkyl(meth) acrylates having from 1 to 20 carbon atoms in the alkyl group. Preferred molecules in this category are hydroxyethyl (meth)acrylate, hydroxypropyl (meth)acrylate, hydroxybutyl (meth)acrylate.

In a particular embodiment of the invention, mixtures of two or more unsaturated compounds (iii) are used. In a particular embodiment of the invention both poly(meth) acryloyl mono-hydroxy compounds and mono(meth)acryloyl mono-hydroxy compounds (iii) are being used. A preferred mono(meth)acryloyl mono-hydroxy compound is the monofunctional epoxyacrylate EBECRYL®113, which was found to improve flexibility and adhesion to plastics.

The amount of compounds (iii) generally is from 20 to 85% by weight of the polyurethane polymer (A), preferably of from 35 to 85% by weight, more preferably from 45 to 75% by weight.

The organic compounds (iv) containing at least two reactive group capable to react with isocyanate groups are preferably polyols. The polyols can be selected from saturated polyols and/or from unsaturated polyols bearing at least one copolymerizable ethylenically unsaturated group such as (meth)acryl and/or vinyl groups. Most typically however they are saturated polyols. By "saturated" is meant that the polyol bears no copolymerizable ethylenically unsaturated groups such as (meth)acryl and/or vinyl groups. Often the polyol is a diol.

Compounds (iv) used in the context of the present invention typically are characterized by a number average molecular weight within the range of from 62 to 5.000 Daltons. More typically the Mn of this compound is at least 400 Daltons, often at least 550 Daltons, more often at least 600 Daltons, even at least 700 Daltons, and usually at most 2000 Daltons. Typically compounds (iv) are polymeric or oligomeric compounds.

Suitable examples of compounds (iv) are polyesters polyols, polyether polyols, polycarbonate polyols, polyacetal polyols, polyesteramide polyols; polyacrylate polyols, polythioether polyols and combinations thereof. Preferred are polyester polyols, polyether polyols and/or polycarbonate polyols. Even more preferred are polyester polyols and/or polycarbonate polyols.

In a particular embodiment of the invention, compounds (iv) are selected from polyester polyols.

In a preferred embodiment of the invention, compounds (iv) comprise at least one polycarbonate polyol, and optionally at least one other polyol (such as a polyester polyol). Preferably the amount of polycarbonate polyols, on the total of compounds (iv), is at least 20% by weight. Typically this amount is at least 30% by weight, more typically at least 50% by weight. Preferably this amount is at least 70% by weight, more preferably at least 80% by weight, up to 100% by weight.

In a particular and preferred embodiment of the invention, compounds (iv) are selected from polycarbonate polyols.

Polyester polyols (iv) typically are obtained from the polycondensation of polycarboxylic acids and polyhydric alcohols. The polycarboxylic acids which may be used for the formation of these polyester polyols may be aliphatic, cycloaliphatic, aromatic and/or heterocyclic and they may be substituted (e.g. by halogen atoms) and be saturated or unsaturated. Examples of suitable aliphatic dicarboxylic acids are succinic acid, glutaric acid, adipic acid, suberic acid, azelaic acid, sebacic acid and/or dodecanedicarboxylic acid. A suitable cycloaliphatic dicarboxylic acid is hexahydrophthalic acid. Examples of aromatic dicarboxylic acids include isophthalic acid, terephthalic acid, ortho-phthalic acid, tetrachlorophthalic acids and/or 1,5-naphthalenedicarboxylic acid. Another suitable aromatic dicarboxylic acid is 5-sulfoisophthalic acid sodium salt. Examples of unsaturated aliphatic dicarboxylic acids which may be used are fumaric acid, maleic acid, itaconic acid, citraconic acid, mesaconic acid and/or tetrahydrophthalic acid. Examples of tri- and tetracarboxylic acids include trimellitic acid, trimesic acid and/or pyromellitic acid. Anhydrides such as e.g. phthalic anhydride and/or trimellitic anhydride can also be used. Preferred in the context of the present invention are saturated polycarboxylic acids. The term "polycarboxylic acid" as used herein extends to suitable anhydrides.

The polyhydric alcohols which are preferably used for the preparation of these polyester polyols include ethylene glycol, propylene glycol, 1,3-propanediol, 1,3-butanediol, 1,4butanediol, 1,5-pentanediol, 1,6-hexanediol, neopentyl glycol, diethylene glycol, dipropylene glycol, triethylene glycol, tetraethylene glycol, dibutylene glycol, 2-methyl 1,3-pentanediol, 2,2,4-trimethyl-1,3-pentanediol, 1,4-cyclohexanedimethanol, ethylene oxide adducts or propylene oxide adducts of bisphenol A and/or hydrogenatedbisphenol A.

Triols or tetraols such as trimethylolethane, trimethylolpropane, glycerin and/or pentaerythritol may also be used. These polyhydric alcohols are generally used to prepare the polyester polyols by polycondensation with the above-mentioned polycarboxylic acids, but according to a particular embodiment they can also be added as a monomer to the polyurethane polymer polymer reaction mixture.

Polyester polyols obtained by the ring opening polymerization of lactones or lactides may also be used. The polyester polyol may, optionally, also contain a long chain saturated or unsaturated fatty acid. In the second case, the resulting polymer can undergo an air-drying curing step optionally catalyzed with siccative agents known in the art.

Preferred polyester polyols (iv) are those made from the polycondensation of adipic acid and neopentylglycol (PANPG), from the polycondensation of adipic acid and 1,6-hexanediol (PAHD), from the polycondensation of adipic acid and 1,4-butanediol (PABD) and/or from the polycondensation of adipic acid and 1,4-cyclohexanedimethanol (PCHD). Most preferred polyester polyols (iv) are those made from adipic acid and neopentylglycol.

Suitable polyether polyols (iv) are for instance polyethylene glycols, polypropylene glycols and/or polytetramethylene glycols, or bloc copolymers thereof.

Suitable polycarbonate polyols (iv) which may be used include the reaction products of diols such as 1,3-propanediol, 1,4-butanediol, 1,6-hexanediol, diethylene glycol, triethylene glycol and/or tetraethylene glycol with phosgene, with diarylcarbonates such as diphenylcarbonate, or with cyclic carbonates such as ethylene and/or propylene carbonate.

Possibly compounds (iv), which most typically are polyester polyols and/or polycarbonate polyols, can contain at least one functionality capable to render the polymer dispersible (in casu soluble) in water, either directly or after the reaction with an appropriate neutralizing agent (C).

In one embodiment, compounds (iv), which most typically are polyester polyols and/or polycarbonate polyols, contain at least one functionality capable to render the polymer dispersible (in casu soluble) in water, either directly or after the reaction with an appropriate neutralizing agent (C). In that case, compound (iv) can replace all or part of compound (ii).

In another embodiment, compounds (iv), which most typically are polyester polyols and/or polycarbonate polyols, do not contain at least one functionality capable to render the polymer dispersible (in casu soluble) in water, either directly or after the reaction with an appropriate neutralizing agent (C).

Possibly compounds (iv), which most typically are polyester polyols and/or polycarbonate polyols, can contain at least one colorant. Examples of suitable colorant diols can be found in WO 03/010250. Some suitable examples include but are not limited to Milliken's reactive colorants REACTINT YELLOW X15, REACTINT BLUE X17AB, REACTINT ORANGE X96, REACTINT RED X64, REACTINT VIOLET X80LT and REACTINT BLACK X41LV. Suitable colorants are disclosed e.g. in U.S. Pat. Nos. 4,284,729, 4,507,407, 4,751,254, 4,761,502, 4,775, 748, 4,846,846, 4,912,203, 4,113,721 and 5,864,002. Preferred are the colorants disclosed in U.S. Pat. No. 5,864,002. Insofar as the definition and methods for producing the colorants are concerned, it is explicitly referred to the above documents. Preferably colorants are used which are sufficiently stable against UV-irradiation and electron beam irradiation.

The amount of compounds (iv) generally is from 0.5% up to 35% by weight of the polyurethane polymer (A). In general their amount is at least 1%, typically at least 2% by weight of the polyurethane polymer (A). Typically their amount is at most 30%, more typically at most 25% by weight of the polyurethane polymer (A).

Compounds (iv) in the context of the present invention preferably are being used in an amount of at least 3%, typically at least 5%, more typically at least 10% by weight of the polyurethane polymer (A). In a preferred embodiment of the invention compounds (iv) are being used in an amount from 10 to 35%, preferably in an amount from 10 to 30%, more preferably in an amount from 10 to 25% by weight of the polyurethane polymer (A). For preferred compounds (iv) see above.

Optionally, a further compound (v) may be used to prepare poly)urethanes (A) of the invention, said compound comprising active amino groups capable of making a chain extension of the remaining isocyanate end-groups of the pre-polymer. The chain extender is suitably a water-soluble aliphatic, alicyclic, aromatic or heterocyclic primary or secondary polyamine. It can also be a hydrazine or a hydrazide derivative having up to 60, preferably up to 12 carbon atoms. In the context of the present invention aliphatic and/or aromatic polyamines (v) capable to react with isocyanate groups are preferred compounds (v). A preferred example is meta-xylendiamine (MXDA).

The total amount of compounds (v) used is generally calculated according to the amount of residual isocyanate groups present in the polyurethane polymer prepolymer. The ratio of isocyanate groups in the prepolymer to the amine groups in the chain extender (v) during the chain extension is generally in the range of from about 1:0.7 to about 1:1, preferably from about 1:0.8 to about 1:0.9 on an equivalent basis. This ratio is more preferably 1:0.9. The chain extension reaction is generally carried out at a temperature between 5° C. and 90° C., preferably between 20° C. and 50° C. and most preferably between 10° C. and 20° C.

The polyamine used has preferably an average functionality of 2 to 4, more preferably 2 to 3. Examples of such chain extenders (v) useful herein comprise hydrazine, adipic dihydrazide, ethylene diamine, piperazine, 1,4-butanediamine, 1,6-hexanediamine, 1,8-octanediamine, 1,10-decanediamine, 1,12-dodecanediamine, 2-methylpentamethylenediamine, isophorone diamine (or 1-amino3-aminomethyl-3,5,5-trimethyl-cyclohexane), m-xylilendiamine (MXDA), 1,3bis(aminomethylcyclohexane) (BAC), bis(4-aminocyclohexyl)methane, diethylene triamine, triethylene tetramine, polyethylene imines, polyoxyethylene polyamines and polyoxypropylene polyamines (e.g. Jeffamines from TEXACO), as well as mixtures thereof.

If the functional group which is susceptible to water dispersion is a sulfonate group, it can be incorporated into the polyurethane polymer by chain extension using sulfonated diamines like for example the sodium salt of 2,4-diamino-5-methylbenzenesulfonic acid or the alpha,omega-polypropyleneglycoldiaminesulfopropyl acid, or the potassium salt thereof (Poly-EPS from Rashig). Typically from 0 to 10% by weight of at least one chain extender (v) is being used. In a preferred embodiment of the invention no compound (v) is used to prepare polyurethane polymers (A) according to the invention. If used however, then compounds (v) typically are used in an amount of from 0.1 to 10% by weight, typically of from 0.5 to 3% by weight, more typically of from 1 to 2% by weight. Preferred in the context of the invention are polyurethane polymers (A) that are obtained from the reaction of from 10 to 60% by weight of at least one polyisocyanate (i); from 2 to 25% by weight of at least one hydrophilic compound (ii) containing at least one reactive group capable to react with isocyanate groups and at least one groups which is capable to render the polyurethane polymer dispersible in aqueous medium either directly or after reaction with a neutralizing agent to provide a salt; from 20 to 85% by weight of at least one polymerizable ethylenically unsaturated compound (iii) containing at least one reactive group capable to react with isocyanate groups; from 1 to 35% by weight of at least one polyol (iv); and from 0 to 10% by weight of at least one chain extender (v) capable to react with isocyanate groups.

Even more preferred in the context of the invention are polyurethane polymers (A) that are obtained from the reaction of from 10 to 60% by weight of at least one polyisocyanate (i); from 3 to 25% by weight of at least one hydrophilic compound (ii) containing at least one reactive group capable to react with isocyanate groups and at least one groups which is capable to render the polyurethane polymer dispersible in aqueous medium either directly or after reaction with a neutralizing agent to provide a salt; from 20 to 85% by weight of at least one polymerizable ethylenically unsaturated compound (iii) containing at least one reactive group capable to react with isocyanate groups; from 3 to 35% by weight of at least one polyol (iv); and from 0 to 10% by weight of at least one chain extender (v) capable to react with isocyanate groups.

The neutralizing agent (C) used in the context of the present invention typically is a non-volatile neutralizing agent, more typically a non-volatile base such as NaOH. Other suitable examples are provided above. For compounds (i) through (v) and preferred amounts to use, see above.

The polyurethane polymer (A) of the invention generally has a double bond equivalent (number of milli-equivalents of ethylenic double bonds per g of solid) of from 1 to 6 meq/g, preferably of from 2 to 4 meq/g. The amount of (meth)acrylated and ethylenically unsaturated groups is usually measured by nuclear magnetic resonance spectroscopy and is expressed in meq per g of solid material. A sample of the composition is dried for 1 day at room temperature and 12 h at 60° C. and then dissolved in N-methylpyrolidinone. The sample is submitted to 1H-NMR analysis in order to measure the molar concentration of (meth)acrylated and ethylenically unsaturated groups using 1,3,5-bromobenzene as internal standard. The comparison between the peak assigned to aromatic protons of the internal standard and the peaks assigned to the (meth)acrylated and ethylenically unsaturated double bonds allow to calculate the molar concentration of (meth)acrylated and ethylenically unsaturated groups according to the formula $(A \times B)/C$ wherein A is the integration of 1H double bonds provided by the sample, B is the number of moles of the internal standard in the sample and C is the integration of 1H provided by the internal standard.

Alternatively, the amount of (meth)acrylated and ethylenically unsaturated groups can also be measured by a titration method following the addition of an excess of pyridinium sulfate dibromide on said unsaturated groups (within glacial acetic acid as solvent and mercury acetate as catalyst). Said excess liberates iodine in the presence of potassium iodide and the iodine is then titrated with sodium thiosulfate. Most typically compounds (A) according to the invention typically are (meth)acrylated compounds.

Typically the polyurethane polymer (A) of the invention is non physically drying (or tacky) before cure. The resin composition (I) of the invention typically is non physically drying (or tacky) before cure. This property is basically the consequence of a relatively low viscosity of the dry polymer at ambient temperature, associated with the low molecular weight of the polymers (A) of the invention. The good flow properties of the polymer are particularly suitable to provide high gloss coatings with a very flat surface development resulting in an excellent mirror effect or distinctness of image (DOI). However, it is desirable in the frame of the invention and for some specific applications to obtain a polymer which is physically drying or tack-free before cure. Alternatively, it can be desirable in the frame of the invention to have reduced polymer flow after film formation and before curing, either in the dry form or in the water-swollen state. In a particular embodiment, it is desirable that this property is being developed over a certain period of time at ambient or elevated temperature. To achieve this, it may be required to go to a thermal physical or chemical hardening of the polymer of the invention respectively by including organic and/or inorganic nano- or micro-sized particles, and by the use of chemical reactions leading to polymer crosslinking after film formation of the colloidal dispersion or by any other suitable means. In particular, the addition of pigments can be considered for colored inks or coatings.

The optional compound (B) is preferably selected from (meth)acrylated compounds (iii) described above and/or from ethylenically unsaturated compounds comprising no functionality which is capable to react with an isocyanate group.

The amount of the optional compounds (B), relative to the total weight of the resin composition (I) of the invention, typically is from 0 to 20% by weight, more typically from 0 to 10% by weight. In an embodiment of the invention, the amount of compounds (B), relative to the total weight of the resin composition (I), is at most 10% by weight, more preferably at most 5% by weight. In an embodiment of the invention no compounds (B) are present. In another embodiment of the invention, compounds (B) are present in an amount of from 0.1 up to 20% by weight, more typically in an amount from 0.1 up to 10% by weight.

Often compounds (B) are monomers, more in particular diluting monomers. Aliphatic and aromatic polyhydric polyols which have been totally esterified with (meth)acrylic acid and contain substantially no residual hydroxyl functionality in the molecule are particularly preferred. Suitable are the esterification products of (meth)acrylic acid with di tri-, tetra-, penta- and/or hexahydric polyols and mixtures thereof. In this context, it is also possible to use reaction products of such polyols with ethylene oxide and/or propylene oxide or mixtures thereof, or reaction products of such polyols with lactones or lactides, which add to these polyols in a ring-opening reaction. Examples of suitable lactones are γ-butyrolactone and, in particular δ-valerolactone and ε-caprolactone. Compounds employed with preference are alkoxylated polyols having no more than two alkoxy groups per hydroxyl functionality, and ε-caprolactone-modified polyols. These modified or unmodified polyols are preferably totally esterified with acrylic acid, methacrylic acid or mixtures thereof until substantially no residual hydroxyl functionality remains. Examples of poly-unsaturated compounds from this category are neopentylglycol diacrylate, 1.6 hexane diol diacrylate, diethyleneglycol diacrylate, dipropyleneglycol diacrylate, trimethylolpropane tri-acrylate, glycerol tri-acrylate, pentaerythritol tetra-acrylate, di-trimethylolpropane tetra-acrylate, di-pentaerythritol hexa-acrylate and their (poly)ethoxylated and/or (poly)propoxylated equivalents, as well as mixtures thereof.

Yet, it is also possible to use any compound from the category of urethane (meth)acrylates, epoxy (meth)acrylates, polyester (meth)acrylates and (meth)acrylic (meth)acrylates or mixtures thereof. The compound (B) can also be an ethylenically unsaturated compound bearing one or more additional functional groups or side-chains providing additional properties to the polymer. Siliconated and/or fluorinated ethylenically unsaturated compounds such as the products commercialized under the names of EBECRYL® 350 and ADDITOL®HGX83 are particularly suitable.

In a particular embodiment of the invention compound (B) is a (meth)acrylated compound with a molecular weight of at most 1000 Daltons.

Resin compositions (I) of the invention permit to obtain coatings which after radiation curing show an excellent chemical resistance against water, solvents and stains, a superior mechanical resistance against scratch and abrasion—while still giving an excellent gloss and mirror effect (distinctness of image). These coatings also exhibit a good adhesion on porous and non-porous substrates. The optical properties care for good transparency and high gloss. The compositions according to the invention are particularly suitable for making coatings for wood furniture and plastic coatings with an excellent mirror effect. Compositions according to the invention are also particularly suitable for coating wood substrates and plastic articles, especially 3-dimensional objects made from polyethylene, polypropylene, polycarbonate, polyvinylchloride, optionally pre-coated with other coatings such as polyurethanes used as primer coatings.

Resin compositions (I) of the invention are also suitable for use in UV stain applications on wood. They present an excellent compatibility and stability with stains, a low foaming, a low stickiness to brushes, and a very low tack. The stains based on resin compositions (I) according to the invention are absorbed more evenly into wood, resulting in a more uniform color aspect. They present an excellent anfeuerung aspect and adhesion on wood. Moreover they have excellent primer properties. Hence these compositions combine excellent adhesion properties necessary for primers as well as the desired properties necessary for stain applications. They permit to replace the two step process wherein a stain and primer are applied to the wood in two different layers by a one shot process wherein stain and primer are combined.

Compounds (B) where present can be added to the polyurethane polymer (A) before, during or after its dispersion in water. Compound (B) can also be added before or during the synthesis of polyurethane (A) when compound (B) does not contain a functional group that can react with the polyisocyanate (i). It can thus be added before, during or after any of the second, third or fourth step of the preparation process of polyurethane (A).

The present invention also relates to a process for the preparation of a radiation-curable composition such as described here above, said process comprising a first step comprising the reaction of compounds (i), (iii) and (iv), a second step, comprising the reaction of the product of the first step with a compound (ii), a third step wherein the product obtained after the second step is further reacted until the residual isocyanate content is lower than 0.1 meq/g, preferably lower than 0.05 meq/g;

a fourth step comprising the dispersion in an aqueous medium of the polyurethane obtained after the third step, an optional step comprising the reaction with a neutralizing agent in order to convert the hydrophilic groups provided by compound (ii) into anionic salts, an optional step comprising the addition of an ethylenically unsaturated compound (B) different from (A).

The neutralization step, when requested, is typically made prior to the dispersion (in casu dissolution depending on the nature of compound A) of the polymer in water. Most typically in the context of the invention a non-volatile neutralizing agent (C) like NaOH is used.

The addition of the ethylenically unsaturated compound (B) can be done after the second, third step or fourth step of the reaction. When the ethylenically unsaturated compound (B) is a compound comprising no functional groups which are capable to react with isocyanate groups, the compound can in addition be added before or during the first or the second step of the reaction.

An advantage of the polyurethane solutions and dispersions (I) of the invention is that they can be prepared according to a solvent free process.

The resin composition and process according to the present invention are advantageous in that they are able to provide dispersions or solutions with low volatile organic content (VOC), a high solids content, a low viscosity, a low particle size, an excellent colloidal stability and a low film formation temperature.

The compositions of the invention are e.g. stable for at least 10 days at 60° C. Resin compositions (I) of the invention most typically are displaying one or more of the following characteristics:

a total solids content of from about 30 to about 50 wt %, preferably from about 35 to about 45 wt %, a viscosity measured at 25° C. of less than 5.000 mPa·s, preferably less than 1.000 mPa·s, more preferably less than 500 mPa s (for dispersions) or less than 50.000 mPa·s, preferably less than 15.000 mPa·s, more preferably less than 5.000 mPa·s (for solutions), a pH value of 6 to 11, preferably of 6.5 to 8.5,
an average particle size of about 10 to 150 nm, most preferably from about 20 to 40 nm (for dispersions),
a film formation temperature preferably below 20° C., more preferably below 5° C., most typically below 0° C.

Preferably compositions of the invention are characterized by a solids content, a viscosity, a pH value, an average particle size and a film formation temperature as indicated above.

Resin compositions (I) of the invention have many applications and can be used amongst others as coating compositions, inks, varnishes or adhesives.

Another aspect of the invention hence relates to compositions (II) that are prepared from a resin composition (I) of the invention. Typically these compositions (II) are radiation curable compositions. Typically these compositions (II) of the invention comprise at least 50% by weight, typically at least 70% by weight, most typically at least 90% by weight of the resin composition (I) of the invention.

In an embodiment of the invention, the composition (II) of the invention is a coating composition that can be applied on any substrate like wood, paper & cardboard, plastic, metal or glass by any suitable application method comprising spray, roller and curtain coating.

Compositions (II) of the invention however are particularly suited for making inks and overprint varnishes.

An embodiment of the invention hence relates to inks and varnishes prepared from a composition according to the invention. A particular embodiment of the invention relates to an ink or overprint varnish comprising at least one composition according to the invention.

The present invention therefore also relates to the use of materials and compositions of the invention for making inks, varnishes or coatings and to a process for making inks, varnishes or coatings wherein a composition (I) and/or a compound (A) as described here above is used.

Varnishes typically are overprint varnishes.

The present invention also relates to a process for preparing a coated substrate or article comprising a step wherein at least one surface of the substrate or article is coated with a composition according to the invention, and preferably, further submitted to curing, particularly under irradiation with UV light or electron beam. In general the composition of the invention is a radiation curable composition.

The present invention also relates to an article or substrate coated, printed or treated, either partially or entirely, with a composition of the invention. Preferably articles or substrates are made from plastics, paper, cardboard, metal, glass, wood and concrete.

The present invention also relates to a method of printing comprising a least one step wherein a substrate is printed with an ink or varnish comprising a radiation curable composition according to the invention.

Another aspect of the invention relates to aqueous ink or varnish compositions prepared from a compound or composition according to the invention. A particular aspect of the invention concerns aqueous ink compositions.

Aqueous ink compositions of the invention can be easily applied to any substrate including paper, cardboard, plastic, fabrics, glass, glass fibers, ceramics, concrete, leather, wood, metals and the like, for industrial or domestic purposes. They can be applied by any conventional method including flexography or heliography, or eventually brushing, spraying and dipping.

The aqueous ink composition according to the current invention is preferably used in an ink-jet printer or any other printing technique using a non-contact application mode. Other known applications can also be targeted, such as in-mould decorations etc.

The coating or the ink of the invention can also be used to provide specific additional features like for instance electrical conductivity or electromagnetic interference shielding for consumer electronic or similar applications. In this case, the printing can consist of plain surfaces or printed circuits.

Optionally, aqueous ink compositions of the present invention further contain an internal or external crosslinking functionality. The term "crosslinking functionality" as used in the present specification is not restrictive and encompasses all kinds of compounds which can thermally react with the polyurethane polymer, preferably with functional groups of the polyurethane polymer to form a three-dimensional network without the use of irradiation. When radiation curing is happening on top of the thermal curing, the composition is said to be used in 'dual cure'. Suitable reactive chemical functionalities are known in the prior art, e.g. carboxylic acids, isocyanates, blocked isocyanates, hydroxyl, amine, epoxy, oxetane, aziridine, aldehyde, ketone, anhydride, carbonate, siloxane, acetoacetoxy, carbodiimide, ureidoalkyl, N methylolamine, N-methylolamide N-alkoxy-methyl-amine, N-alkoxy-methyl-amide, or the like. These other crosslinking functionalities may be present in the resin composition (I), in particular in the polymer (A) and/or by an additional crosslinking agent, in particular a vinyl-type polymer as discussed above. The term"vinyl type" polymer as used in the present specification is not specifically restricted and should encompass all types of polymers obtainable by polymerisation, preferably by free radical polymerisation of a vinyl-type monomer. Which crosslinking agent should be used depends on the type of crosslinkable functionality in the polyurethane polymer and the crosslinking agent can be chosen by a skilled person accordingly in order to reach the desired performance.

Compositions (II) according to the present invention are preferably curable by ultraviolet irradiation, generally in the presence of photoinitiator. They can also be cured by electron-beam irradiation, allowing the use of compositions free of photoinitiator. The compositions according to the invention are providing extremely rapid curing.

Compositions of the present invention preferably contain an initiator, called a photoinitiator, which starts the crosslinking reaction upon exposure to UV-irradiation. The preferred photo-initiator of the present invention is a photoinitiator for radical polymerization. The photoinitiator is preferably used in a concentration from 0.1 to 10% d/d.

Photoinitiators which may be used according to the present invention are selected from those conventionally used for this purpose. Suitable photoinitiators include amongst others aromatic carbonyl compounds such as benzophenone and its alkyl or halogen derivatives, anthraquinone and its derivatives, thioxanthone and its derivatives, benzoin ethers, aromatic or non-aromatic alpha-diones, benzyl dialkylketals and acetophenone derivatives.

It can be advantageous in certain cases to associate, in the same molecule, the tertiary amine function having at least one hydrogen atom on at least one carbon atom adjacent to the nitrogen atom, with the aromatic ketone function, such as, for example: 2-isopropyloxy-2-(4-dimethylaminophenyl) propiophenone, 4-dimethylamino benzophenone, 4,4'-bis(dimethylamino)benzophenone, 2-diethylamino-9-fluorenone, 7diethylamino-4-methylcoumarin, N-methylacridone, and the like. Similarly, it is possible to associate in the same molecule the tertiary amine function, having at least one hydrogen atom on at least one carbon atom adjacent to the nitrogen atom; with at least one acrylic or methacrylic radical, such as in, for example: the mono-, di- and triacrylates or methacrylates of triethanolamine, of N-methyldiethanolamine, of N,N-dimethylethanolamine or of N,N-di (2-hydroxyethyl) aniline. For curing compositions according to the invention by an accelerated electron beam, it is not necessary to use a photoinitiator, since this type of radiation produces by itself a sufficient quantity of energy to produce free radicals and to ensure that curing is extremely rapid.

If desired, the compositions of the present invention may include other auxiliary substances (additives) which may be added to the final composition in order to impart or improve desirable properties or to suppress undesirable properties. These additives include known biocides (e.g. Acticide®AS), surfactants, antioxidants (e.g. Irganox®245), plasticizers (e.g. dioctyl phtalate), pigments (e.g. titanium dioxide), silica sols (e.g. Acemat®TS100), flow and leveling agents (i.e. Byk®306), wetting agents (e.g. Byk®346), humectants (e.g. ethylene glycol, 2-pyrrolidinone, 2-methyl-2,4-pentanediol), foam control agents (e.g. Dehydran®1293), thickening agents and rheology modifiers (e.g. Ucecoat®8460), coalescing agents (e.g. Dowanol®DPM), heat stabilizers (Irganox®245), light stabilizers (e.g. Tinuvin®328 or Tinuvin®622), transorbers (such as described in U.S. Pat. No. 5,643,356), wax (e.g. Aquacer®535, Aquamat®208), fillers (e.g. talc), adhesion promoters (e.g. Tizor®IAM), dyes and tints, etc.

The compositions of the invention may also be blended with (other) polymer dispersions, for example, polyethylene, polypropylene, polystyrene, polybutadiene, polyvinyl chloride, polyvinyl acetate, polyacrylate epoxy resin and polyester dispersions, as well as co-polymers and hybrid polymers therefrom.

After having been applied to the substrate, compositions of the invention are typically cured by irradiation curing by UV light or electron beam. Preferably UV light (80 W/cm or 120 W/cm) or electron beam (e.g. 50 kGy, 250 kv) are used for curing.

With compositions of the invention, excellent adhesion, outstanding water and solvent resistance, mechanical strength, durability, flexibility and transparency, high gloss and superior distinctness of image were obtained. With pigmented compositions of the invention, a deep color could be obtained. The aqueous ink compositions of the invention that exhibit good color intensity are usually made by blending the polymer dispersion with pre-dispersed pigment dispersions in order to maximize the color definition, depth or durability.

Aqueous ink compositions of the invention have the advantage that they can be used in inkjet equipment with long and robust printing operations not leading to any blocking of the nozzles due to lack of colloidal stability, adverse non-Newtonian rheological behavior or premature polymer drying. They can be used more generally for any coating operation aiming to deliver a chemical and mechanical resistant coating after cure in combination with superior optical properties, like gloss and distinctness of image (DOI). In any case, the re-dispersibility (in casu re-solubility) of the ink or coating guarantees an easy cleaning operation with tap water or alkaline water solution of the coating equipment and its immediate environment covered with overspray or the like; no volatile solvents are requested during the cleaning so that the safety, health and environmental impact is being minimized. The cured coatings and inks from the invention are further characterized by an optimal balance of adhesion, flexibility, mechanical resistance and chemical resistance. It is particularly the case for printing on plastic substrates, particularly relevant being plasticized PVC sheets (50µ thickness, white color) where the initial adhesion is excellent but is also maintained after thermal and/or mechanical stress.

Throughout the whole of the application and in particular in the examples section the following test and measurement methods have been used:

Isocyanate Content:

The isocyanate content in a prepolymer reaction mixture was measured using the dibutylamine back-titration method.

Solid Content:

The solids content was measured by gravimetric method involving drying the dispersion or solution during 2 h at 120° C.

Viscosity:

The viscosity ($\eta$) of the aqueous polymer dispersions (in casu solutions) was measured at 25° C. with a Brookfield RVT Viscometer, using spindle No. 1 at 50 rpm when the viscosity was under 200 mPa s or spindle No. 2 at 50 rpm when the viscosity was higher than 200 mPa s.

pH:

measured according to DIN EN ISO 10390.

Gloss:

gloss is measured at angles of incidence of 60°.

Average Particle Size:

The average particle size of aqueous polymer dispersions was measured by laser light scattering using a Malvern Particle Analyzer Processor types 7027 & 4600SM.

Colloidal Stability:

The colloidal stability of the aqueous polymer dispersion was assessed by observing the decantation and/or phase separation on a 20 g sample placed in an oven at 60° C. as shown by Multiple Light Scattering (Turbiscan®); the colloidal stability is reported as the number of days before a dispersion sedimentation exceeding 2% of the total height of the sample. A good colloidal stability is obtained when no product deterioration is observed during 10 days at 60° C.

Molecular Weight Distribution:

The number-average molecular weight (Mn), the weight-average molecular weight (Mw) and polydispersity are determined by conventional gel permeation chromatography (GPC) with polystyrene standards (EasyCal from Polymer Laboratories with Molecular Weight range from 200-7.500.000 g/mol. A small portion of the sample is dissolved in tetrahydrofuran (THF) and injected into a liquid chromatograph (Merck-Hitachi L7100) equipped with 4 PLGel Mixed-A polystyrene divinylbenzene GPC columns (300 mm×7.5 mm×20 µm). The components of the sample are separated by the GPC columns based on their molecular size in solution and detected by a Refractive Index detector. Data were gathered and processed by Polymer Laboratories Cirrus GPC software.

Tackiness:

The residual tack of the coating or ink was measured by pressing the finger on the coating and assessing the ease to separate the finger without adherence; the adherence is expressed in a scale from 1-5 (5=no tack).

Adhesion:

The adhesion was measured using an adhesive tape pressed on the cured composition and removed rapidly; the damage was expressed using a 1-5 scale (5=excellent).

Adhesion on PVC:

A coating (50 g/m$^2$ wet) is applied on a plasticized PVC film, dried 5 minutes at 30° C. followed by 5 minutes at 60° C., and cured by two passes at 5 m/min with a conveyor belt equipped with one mercury lamp of 80 W/cm. The complete cure of the coating is evaluated by 50 Acetone double rubs (method described elsewhere in the patent).

The adhesion was measured using an adhesive tape pressed and removed rapidly; the damage was expressed using a 1-5 scale (5=excellent).

Adhesion is evaluated just after cure and after aging at 60° C.

Adhesion on PVC after Elongation and Mechanical Stress 2 cm large/10 cm long coated PVC films prepared as described in the adhesion on PVC method are stressed at a speed of 50 mm/min until 300% elongation is obtained.

Films are first examined visually; if defects/cracking are already observed coating is evaluated as 0, if no defect can be seen, adhesion with a tape is done and the result expressed using a 1-5 scale (5=excellent).

The film is than crinkled five times with a rotational movement of the hands, and evaluated again using the same 0-5 scale.

Solvent Resistance (Double Rubs):

The solvent resistance and the water resistance of the cured composition were evaluated in the given conditions by the use of double rubs with a piece of cotton rag saturated with isopropanol (IPA), acetone or water until the coating is removed (i.e. is showing through). One double rub is equal to a forward and backward stroke. The reported number (ADR) is the number of double rubs required to break through the cured composition.

Scratch Resistance:

The scratch resistance was assessed using the steel wool passing with a back & forth motion on the cured composition; the damage was ranked using a 1-5 scale (5=excellent).

The examples which will follow illustrate the invention without limiting it.

Aqueous polyurethane dispersions (I) have been prepared following the process described here below. Quantities and nature of the components are given in Table 1.

PREPARATION EXAMPLES EX1 TO EX2 AND EX3-R TO EX 5-R

A double-wall glass reactor equipped with a mechanical stirrer, a thermocouple, a vapor condenser and a dropping funnel was charged under air-sparge with at least one compound (iii) (typically unsaturated alcohols), with one or more compounds (iv) (typically saturated polyols), as well as polymerization additives (0.20 g Butylated hydroxytoluene (BHT) and 0.08 g Bismuth octoate). The reaction mixture was completely homogenized and heated to 40° C. Compounds (i) were slowly added to the vessel in approximately 2 hours in order to maintain the temperature below 55° C. After complete addition of compounds (i), the reaction mixture is maturated 1 hour more at 55° C.

Compounds (ii) were then added to the reaction mixture. After 30 minutes homogenization at 55° C. the reaction mixture was maturated 1 hour at 75° C. The temperature was then increase to 95° C. and was maintained at this temperature until the residual NCO content became lower than 0.10%. This value can also be expressed as 0.02 meq/g based on the dry monomer, oligomer and polymer composition. Mass temperature is then decreased to 75° C.

A partial neutralization of carboxylic acid groups was done by addition of an aqueous solution of 31 wt. % sodium hydroxide or by addition of triethylamine (TEA). 20 minutes after this addition, 596 g of demineralized water was slowly added to the reactor in around 30 minutes and under high shear agitation. The dispersion obtained is homogenized 1 hour at around 50° C. Solid content was adjusted to the desired percentage solids by adding more water. The dispersion is cooled down to room temperature and filtered over a 5 μm filter bag.

Quantities and nature of the components used to prepare EX1 to EX3 resin compositions are given in Table 1. Characteristics are summarized in Tables 2 to 4.

A comparison was made with 2 commercial grades falling outside the scope of the invention: UCECOAT® 7674 (Ex4-R) and UCECOAT® 7689 (ex 5-R). UCECOAT® 7674 has no compound (iv) built into its backbone although it has a low molecular weight (<15,000 Daltons) and it is neutralized with a non-volatile compound (NaOH solution). UCECOAT® 7689 does contain a compound (iv) (a polycarbonate) built into its backbone but has a higher molecular weight (>15.000 Daltons) and is neutralized with a volatile amine (TEA).

Formulations Used for Testing

To test adhesion on PCV the following formulations were used:

Ink formulation (in parts, p)
  45p of a resin composition (I) of the invention (at 40% solids content)
  10p of EBECRYL™ 145 (di functional acrylate monomer from Cytec)
  5p of a photo-initiator blend consisting of: 30% EDB, 15% ITX, 5% IRGACURE® 369, 5% TPO, 31% BDK, 14% BZP
  6p Hostajet BG-PT VP2689 (blue pigment master batch from Clariant)
  0.3p DC 57 (silicone based leveling agent from Dow Corning)
  In addition, water up to 100p For other tests the following formulations were used
  Formulation (in parts, p)
  100p of a resin composition (I) of the invention (at 40% solids content)
  1.5p ADDITOL™ BCPK (photo initiator from Cytec)
  0.8p UCECOAT™ 8460 (Thickener from Cytec)

All formulations were cured as follows:

Coating or ink applications were applied onto the substrate (100μ wet layer) with a doctor blade or a bar coater. They were subsequently dried for 4 minutes at 30° C., then for 2 minutes at room temperature, followed by 5 minutes at 50° C. UV curing was 1×5 m/min with a 80 W Hg lamp.

TABLE 1 composition of the polyurethane dispersions (I)

| | Compounds | EX1 | EX2 | EX3-R |
|---|---|---|---|---|
| (A)(i) | HDI | 88.5 | 88.5 | 88.5 |
| (A)(ii) | DMPA | 23.5 | 23.5 | 23.5 |
| (A)(iii) | TMP(OP)3dA | 151 | 151 | 151 |
| | EB113 | 43 | 43 | 43 |
| (A)(iv) | PA NPG 1000 | | 77 | |
| | PHC 1000 | 77 | | 77 |
| Other | NaOH (31%) | 18 | 18 | |
| | TEA | | | 14 |
| | Water | 596 | 596 | 596 |

HDI: 1,6-diisocyanatohexane
DMPA: 2,2-dimethylolpropionic acid
TMP(OP)3dA: propoxylated trimethylolpropane diacrylate with in average 3 propylene oxide units
EB113: monofunctional epoxyacrylate
PA NPG 1000: polyester polyol made from the polycondensation of adipic acid and neopentylglycol
PHC 1000: polycarbonate polyol
TEA: triethylamine

TABLE 2 properties of the compositions (I)

| Properties | EX1 | EX2 | EX3-R | EX4-R | EX5-R |
|---|---|---|---|---|---|
| Solid content, % | 38.0 | 38.0 | 38.0 | 40.0 | 34.5 |
| Viscosity, mPa · s | 275 | 120 | 190 | 40 | 110 |
| pH | 7.3 | 7.4 | 7.3 | 6.9 | 7.5 |
| Particle size, nm | 33 | 50 | 45 | 60 | 38 |
| Re-dispersible | yes | yes | no | yes | no |
| MFFT, ° C. | <0 | <0 | <0 | <0 | <0 |
| Stability 60° C., days | >10 | >10 | >10 | >10 | >10 |
| Mw, Daltons | 8.500 | 8.700 | 7.900 | 4.100 | >15.000 |

TABLE 3

Re-dispersibility data

| | EX1 | EX2 | EX3-R | EX4-R | EX5-R |
|---|---|---|---|---|---|
| Insoluble materials[1], % | 0 | 2.8 | 86.9 | 1.2 | 98.5 |
| Particle size before test, nm | 33 | 50 | 45 | 60 | 65 |
| Particle size after test, nm | 72 | 125 | N/A | 105 | N/A |
| Increase (%) in particle size | 218 | 250 | N/A | 175 | N/A |

N/A: not applicable
[1]parts not gone back into dispersion

TABLE 4 performance testing

| Properties | EX1 | EX2 | EX3-R | EX4-R | EX5-5 |
|---|---|---|---|---|---|
| Tack before cure (0-5) | 1 | 1 | 1 | 1 | 4 |
| Transparency (0-5) | 5 | 5 | 5 | 5 | 4 |
| Gloss 60° C. (%) | 92 | 93 | 89 | 95 | 75 |
| Scratch resistance (0-5) | 4 | 4 | 4 | 4 | 3 |
| Water resistance (double rubs) | >100 | >100 | >100 | >100 | >100 |
| Solvent resistance (acetone double rubs) | >100 | >100 | >100 | >100 | >100 |
| Adhesion on PVC 50μ, immediate (0-5) | 5 | 5 | 5 | 4 | 4 |
| Adhesion on PVC 50μ, aging 24 h 60° C. (0-5) | 5 | 2 | 5 | 1 | 4 |
| Adhesion on PVC 50μ, elongation 300% (0-5) | 5 | 5 | 5 | 2 | 3 |
| Adhesion on PVC 50μ, elongation 300%, crinkle test (0-5) | 5 | 4 | 5 | 1 | 3 |

The invention claimed is:

1. An aqueous resin composition (I) comprising:
   at least one NCO-terminated polymerizable ethylenically unsaturated polyurethane polymer (A),
   optionally, at least one polymerizable ethylenically unsaturated compound (B) different from (A), and
   optionally, at least one neutralizing agent (C) selected from the group consisting of non-volatile neutralizing agents and organic neutralizing agents with a boiling point higher than 100° C.;
      wherein the polyurethane polymer (A) has a weight average molecular weight of less than 15,000 Daltons and is obtained from the reaction of:
         at least one aliphatic or cycloaliphatic polyisocyanate (i);
         at least one hydrophilic compound (ii) containing at least one reactive group capable to react with isocyanate groups and at least one group which is capable to render the polyurethane polymer dispersible or soluble in an aqueous medium either directly or after reaction with the neutralizing agent (C) to provide a salt;
         at least one compound (iii) containing essentially one nucleophilic function capable to react with isocyanate groups and at least one copolymerizable ethylenically unsaturated group; and
         at least one saturated polyol (iv) containing at least two reactive groups capable to react with isocyanate groups;
      wherein no chain extender (v) containing at least two reactive groups capable to react with isocyanate groups and different from (iv) is present;
      wherein compounds (iii), and (iv) and (v) are different from each other;
      wherein an equivalent ratio of isocyanate groups provided by compound (i) to isocyanate-reactive groups provided by compounds (ii), (iii) and (iv) is from 1.05:1 to 1.20:1;
   wherein non-volatile components of the resin composition (I) after drying are re-dispersible or re-soluble in water at 25° C.;
   wherein re-dispersible means that at most 20% by weight of the non-volatile components of the resin composition (I), after drying and subsequent soaking in demineralized water at 25° C. for 24 hours, have not gone again into dispersion, and wherein re-soluble means that at most 20% by weight of the non-volatile components of the resin composition (I), after drying and subsequent soaking in demineralized water at 25° C. for 24 hours, have not gone again into solution; and
   wherein the resin composition (I) has an acid number from 20 mg KOH/g to 100 mg KOH/g.

2. The resin composition of claim 1 which is a dispersion in water.

3. The resin composition of claim 1 comprising, relative to the total weight of compounds (A) and (B), from 60 to 100% by weight of compound (A) and from 0 to 40% by weight of compound (B).

4. The resin composition of claim 1 wherein no compound (B) is present.

5. The resin composition of claim 1 wherein the polyurethane polymer (A) is obtained from the reaction of:
   from 10 to 60% by weight of the at least one polyisocyanate (i);
   from 2 to 25% by weight of the at least one hydrophilic compound (ii) containing at least one reactive group capable to react with isocyanate groups and at least one group which is capable to render the polyurethane polymer dispersible in the aqueous medium either directly or after a reaction with the neutralizing agent to provide a salt;
   from 20 to 85% by weight of the at least one compound (iii) containing essentially one reactive group capable to react with isocyanate groups and at least one copolymerizable ethylenically unsaturated group; and
   from 1 to 35% by weight of the at least one saturated polyol (iv) containing at least two reactive groups capable to react with isocyanate groups.

6. The resin composition of claim 1 wherein the polyurethane polymer (A) bears ionic groups formed after reaction with the at least one neutralizing agent (C) selected from the group consisting of non-volatile neutralizing agents and organic neutralizing agents with a boiling point higher than 100° C.

7. The resin composition of claim 1 wherein the polyurethane polymer (A) bears anionic groups formed after reaction with one or more inorganic bases.

8. The resin composition of claim 7 wherein said inorganic base is an alkali metal hydroxide.

9. The resin composition of claim 1 wherein the at least one saturated polyol (iv) contains at least one functionality capable to render the polymer dispersible or soluble in water, either directly or after the reaction with the neutralizing agent (C).

10. The resin composition of claim 1 wherein the at least one saturated polyol (iv) is at least one selected from the group consisting of polyester polyols and polycarbonate polyols.

11. The resin composition of claim 1 wherein the at least one saturated polyol (iv) is a polycarbonate polyol.

12. The resin composition of claim 1 wherein the polyurethane polymer (A) has a weight average molecular weight in the range of from 1,000 to 12,000 Daltons.

13. A radiation curable composition (II) comprising at least 50% by weight of the resin composition of claim 1.

14. An article or a substrate coated or printed, either partially or entirely, with the composition according to claim 13.

15. The resin composition of claim 12 wherein the polyurethane polymer (A) has a weight average molecular weight in the range of from 3,000 to 9,000 Daltons.

16. The resin composition of claim 5 wherein the at least one saturated polyol (iv) is present in an amount from 3 to 35% by weight, and is at least one selected from the group consisting of polyester polyols, polyether polyols, and polycarbonate polyols.

17. The resin composition of claim 16 wherein the at least one saturated polyol (iv) is at least one selected from the group consisting of polyester polyols and polycarbonate polyols.

18. The resin composition of claim 1 wherein the at least one saturated polyol (iv) comprises at least one polycarbonate polyol, and optionally at least one other polyol.

19. The resin composition of claim 18 wherein the amount of polycarbonate polyol, relative to the total of the at least one saturated polyol (iv), is at least 20% by weight.

20. The resin composition of claim 1, wherein the at least one aliphatic or cycloaliphatic polyisocyanate (i) is not a tetramethylxylylene diisocyanate.

21. The resin composition of claim 1, wherein the resin composition contains no non-ionic stabilizing groups.

* * * * *